United States Patent
Prabhakaran

(10) Patent No.: US 7,529,968 B2
(45) Date of Patent: May 5, 2009

(54) STORING RAID CONFIGURATION DATA WITHIN A BIOS IMAGE

(75) Inventor: Rajesh Prabhakaran, Duluth, GA (US)

(73) Assignee: LSI Logic Corporation, Milpitas, CA (US)

( * ) Notice: Subject to any disclaimer, the term of this patent is extended or adjusted under 35 U.S.C. 154(b) by 480 days.

(21) Appl. No.: 11/267,999

(22) Filed: Nov. 7, 2005

(65) Prior Publication Data

US 2007/0168701 A1 Jul. 19, 2007

(51) Int. Cl.
*G06F 11/00* (2006.01)
(52) U.S. Cl. .......................................... 714/6
(58) Field of Classification Search .............. 714/6, 714/7, 8
See application file for complete search history.

(56) References Cited

U.S. PATENT DOCUMENTS

| | | | | |
|---|---|---|---|---|
| 5,504,858 A * | 4/1996 | Ellis et al. | | 714/6 |
| 5,875,457 A * | 2/1999 | Shalit | | 711/114 |
| 6,282,670 B1 * | 8/2001 | Rezaul Islam et al. | | 714/6 |
| 6,651,165 B1 * | 11/2003 | Johnson | | 713/2 |
| 6,952,794 B2 * | 10/2005 | Lu | | 714/7 |
| 6,996,743 B2 * | 2/2006 | Knapp, III | | 714/6 |
| 7,076,606 B2 * | 7/2006 | Orsley | | 711/114 |
| 7,143,308 B2 * | 11/2006 | Tseng et al. | | 714/6 |
| 7,302,522 B2 * | 11/2007 | Khan et al. | | 711/114 |
| 2002/0152416 A1 * | 10/2002 | Fukuda | | 714/7 |
| 2002/0194528 A1 * | 12/2002 | Hart | | 714/6 |
| 2005/0055603 A1 * | 3/2005 | Soran et al. | | 714/7 |
| 2006/0161805 A1 * | 7/2006 | Tseng et al. | | 714/6 |

\* cited by examiner

*Primary Examiner*—Bryce P Bonzo
(74) *Attorney, Agent, or Firm*—North Weber & Baugh LLP

(57) ABSTRACT

A system, apparatus and method for storing and maintaining drive configuration data related to disk drives within a RAID. In one embodiment of the invention, configuration data is stored external to the disk drives within the RAID. A scan(s) is performed of the RAID disk drive configuration and/or configuration data on the disk drives. Mismatches or errors within the RAID disk drive configuration may be corrected using the configuration data stored external to the RAID disk drives.

20 Claims, 5 Drawing Sheets

STORING RAID CONFIGURATION DATA WITHIN A BIOS IMAGE

BACKGROUND

A. Technical Field

The present invention relates generally to the configuration of Redundant Array of Independent Disks ("RAID"), and more particularly, to the method for storing RAID configuration data external to disk drives within a RAID.

B. Background of the Invention

RAID storage systems employ multiple disk drives for storing redundant information among the drives so that lost data may be reconstructed in the event of drive failure or data corruption. The use of multiple drives increases data integrity, fault-tolerance and overall performance. A RAID storage system typically also includes a controller(s) to manage the storage of data on the disks. A RAID controller may be hardware, firmware or a software RAID controller.

A hardware RAID controller has large silicon area where any additional information, such as RAID configuration details can easily be stored. Typically, in a hardware-based RAID solution, the RAID configuration details are stored on the disks as well as on some dedicated chips such as a flash memory. The disks are basically arranged in multiple arrays in a RAID storage system. When one or more disks within an array fail, or any error occurs, the configuration of the RAID system may become corrupted. In order to re-configure the RAID system, the configuration details are retrieved from the disks if available, or from the dedicated chips. The lost configuration data is generally re-written back on the controller by accessing these dedicated chips or flash chips. Thereafter, the system is rebooted.

However, in a software-based RAID solution, certain configuration data, including current configuration data, are stored only on the disks within the RAID and not in other locations within the RAID or host system. FIG. 1 illustrates an exemplary host and RAID system which includes a RAID 100 having certain configuration data stored on the disk 105. Whenever the system boots up, the operating system 101 reads the configuration details 106 stored on the disks 105 in order to identify the current RAID or disk configuration.

If one or more disks 105 is malfunctioning (either partially or a complete failure), the host system may not be able to retrieve the most current disk configuration data. As a result, it may become difficult to recreate a current RAID configuration or identify and associate certain disks within the particular array.

In a typical scenario, a single or plurality of disks within a RAID may fail or otherwise become corrupted. The failed or corrupted disks may give rise to a disk configuration mismatch or configuration failure. A user may want to recreate the exact configuration, which was present previously. However, since the configuration details were stored only on the disks, data relating to this configuration may be lost.

FIG. 2 shows a RAID storage system 200 having four disk drives 202-205 and a RAID controller 201. Configuration data 209 of the disks is present in software written on each of the RAID storage drives. If one of the drives fails then the configuration data would be lost or irretrievable in that particular drive. For example, a RAID may have drive 1 202, drive 2 203, drive 3 204 and drive 4 205 that are configured together. During the operation of the RAID, a particular drive fails and a user replaces the failed drive. This drive replacement may result in a configuration-mismatch scenario where it is difficult, if not impossible, to predict the earlier configuration.

What is needed is a method and apparatus that addresses the above described limitations.

SUMMARY OF THE INVENTION

The present invention provides RAID configuration data as part of BIOS image, or other device external to drives within the RAID, on software RAID solutions. In one embodiment of the invention, RAID configuration data is copied and stored in software at a location external to the disk drives. During the operation of the RAID or at boot-up, these disk drives are scanned intermittently so as to identify any configuration failure within the RAID. The configuration data, which is stored external to the drives, is then used to repair any configuration failures or mismatches on the drives.

One skilled in the art will recognize that this configuration data may be copied and stored in various locations within a RAID and host system such as at a controller or a memory device located on the host motherboard. In one embodiment, this configuration data may be stored within an option ROM located on a RAID controller or memory device in the host system. A scanning device, that accesses the option ROM, may also provide functionality that enables intermittent scanning of the drive configuration data.

The configuration data may be written to the option ROM or the disk drives by using various flash utilities or other high-level utilities known in the art. The externally stored configuration data may relate to a complete, partial, or compressed representation of the configuration data as stored on the disks within a RAID array. In the event of a configuration-mismatch or failure, the configuration details stored as part of BIOS image can easily be accessed in order to update or correct the RAID configuration.

The configuration failure is repaired either by writing RAID configuration data on the drives or by using said RAID configuration data to write dynamic configuration data on the drives by a user.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1 illustrates a RAID storage and host system

DETAILED DESCRIPTION OF THE PREFERRED EMBODIMENTS

A system, apparatus and method for storing and maintaining drive configuration data related to disk drives within a RAID are described. In one embodiment of the invention, configuration data is stored external to the disk drives within the RAID. A scan(s) is performed of the RAID disk drive configuration and/or configuration data on the disk drives. Mismatches or errors within the RAID disk drive configuration may be corrected using the configuration data stored external to the RAID disk drives.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

A system and a method to provide RAID configuration data in software RAID solutions are disclosed. In one embodiment of the present invention, RAID configuration data is stored as part of BIOS image within an option ROM. The option ROM may be present in a RAID controller, a memory within a host system (perhaps located on the host motherboard) or other location external to the RAID disk drives. The configuration data may reflect the whole or compressed form of the configuration data as stored on the disks within the RAID array or may be a small subset of the same. In the event of any configuration-mismatch or partial or complete configuration failure, the configuration details stored as part of BIOS image can easily be accessed in order to update or correct/repair the RAID configuration.

B. Configuration Data within Controller

Figure 1:
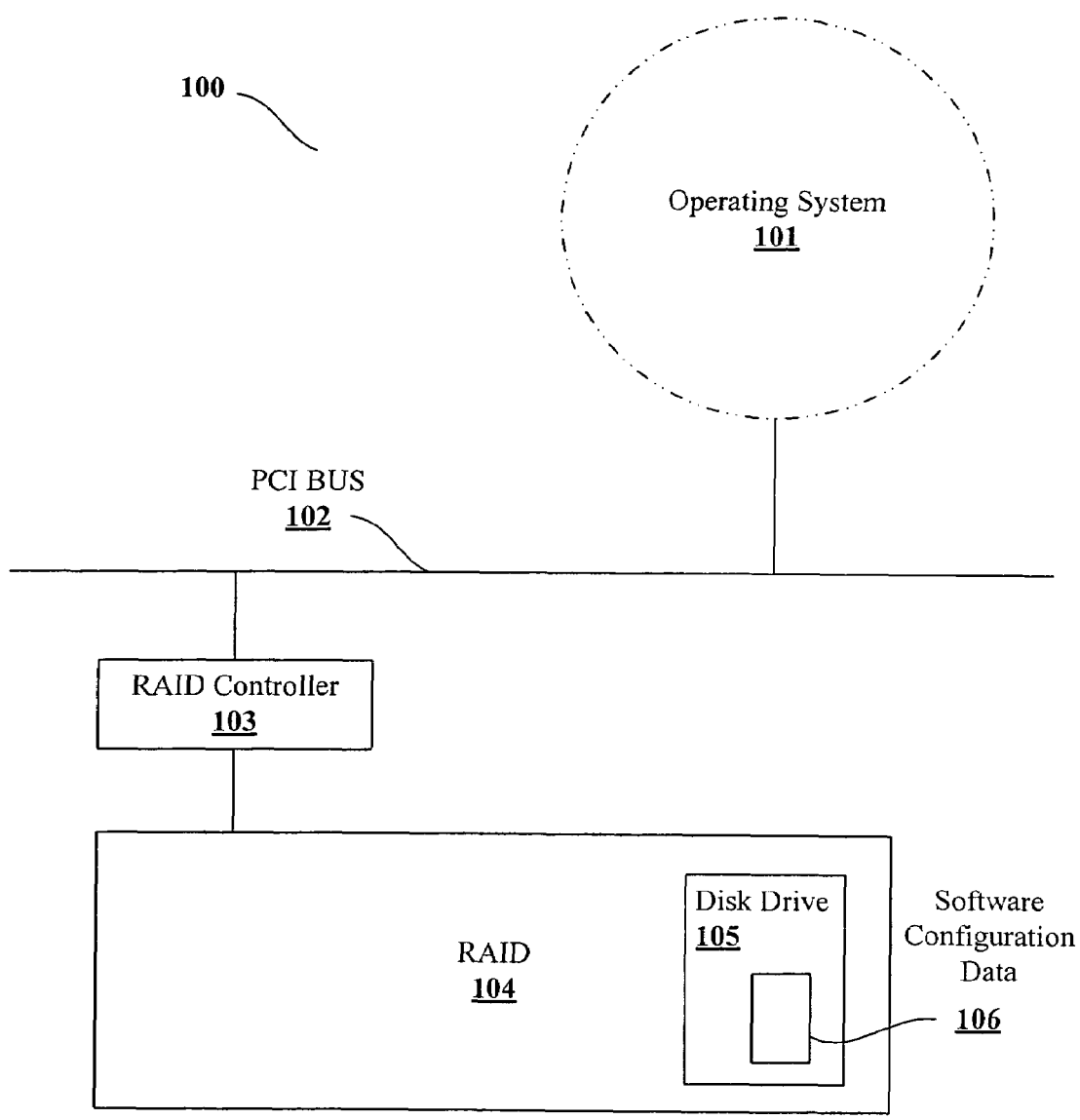
Figure 2:
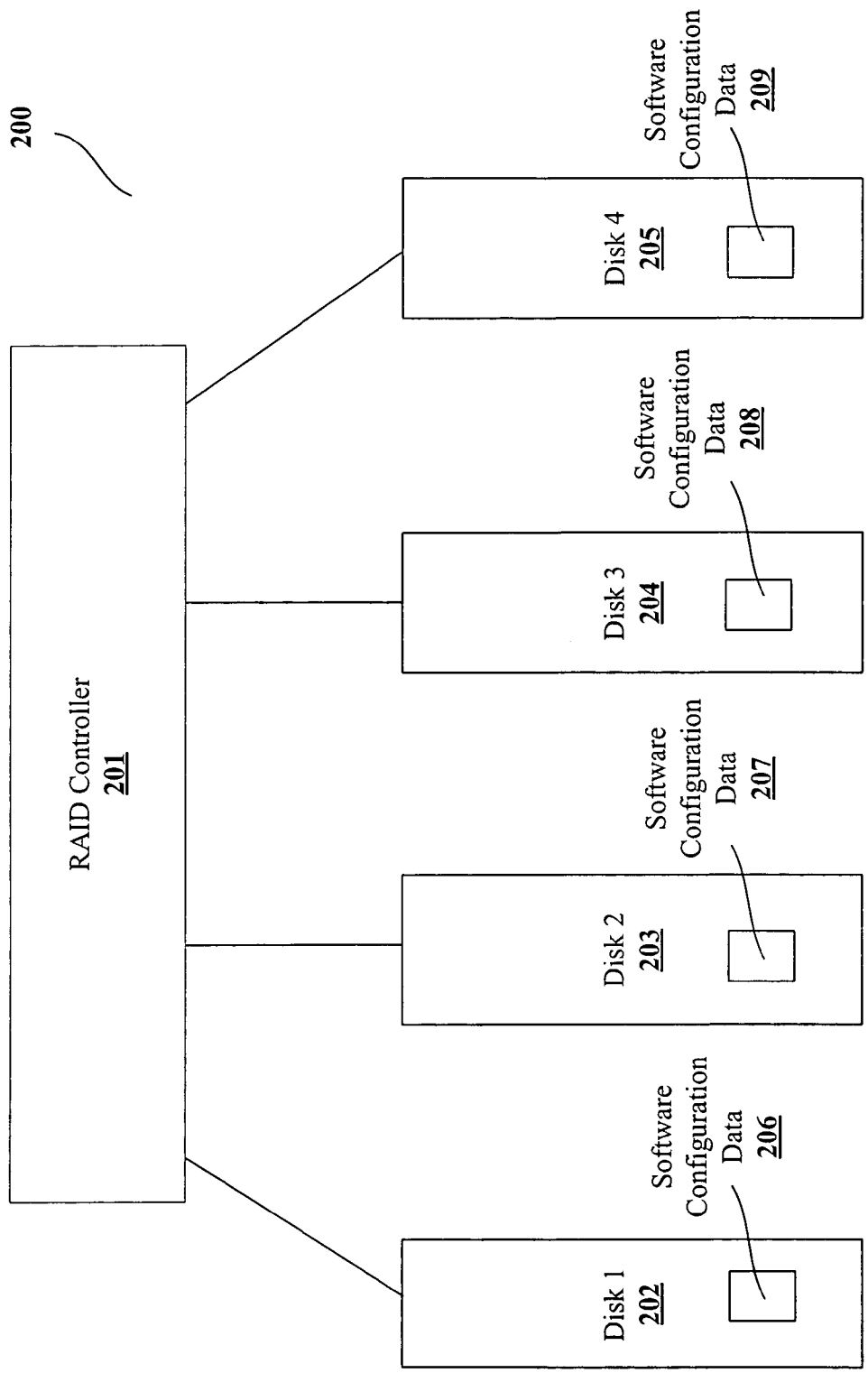
FIG. 2 illustrates a software RAID solution available in the prior art where the configuration details are stored only on the disk drives.
Figure 3:
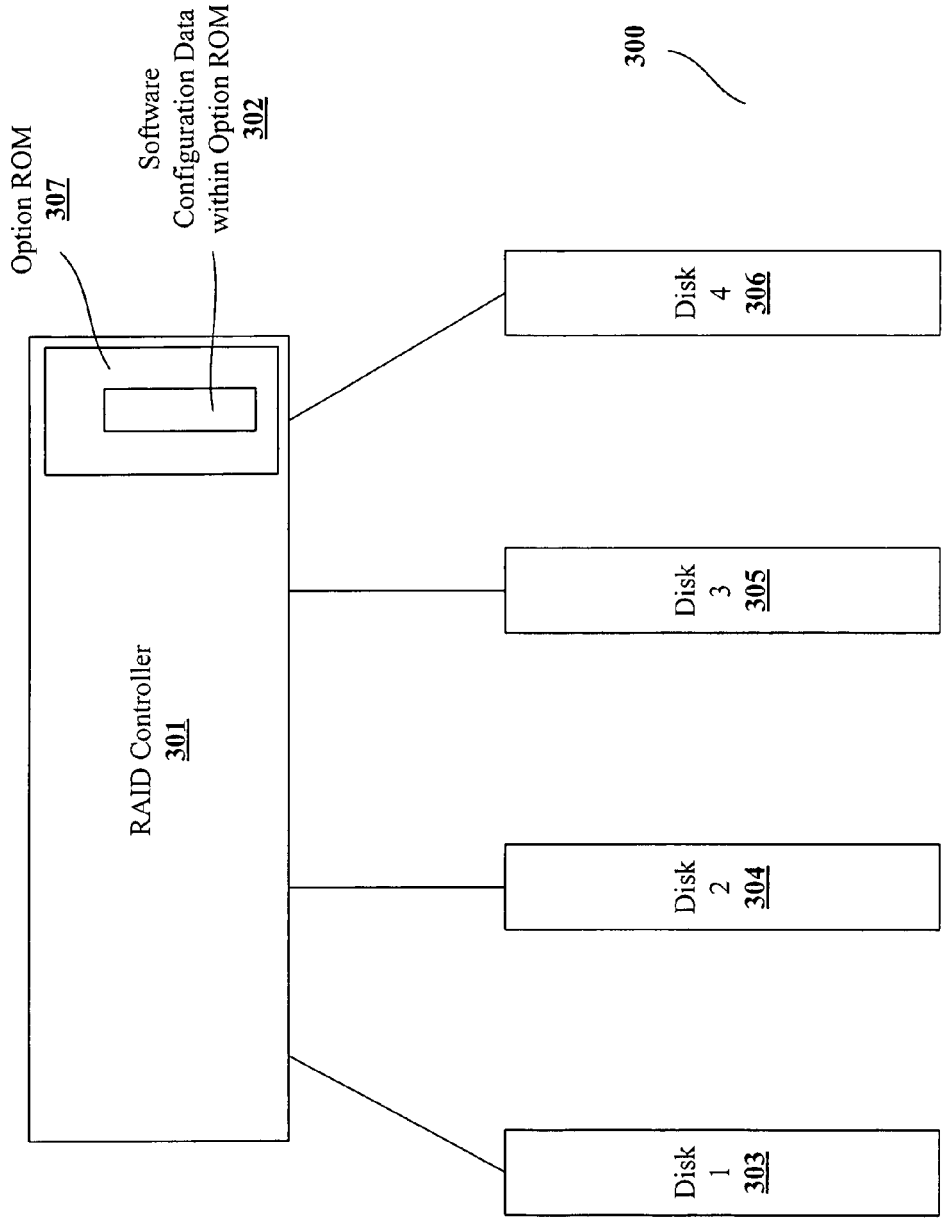
FIG. 3 illustrates software configuration data within the option ROM located on the RAID controller according to one embodiment of the invention.

FIG. 3 illustrates a RAID environment having an option ROM according to one embodiment of the invention. As shown, a RAID storage system 300 comprises a plurality of disks 303-306 and a RAID controller 301. Each disk 303-306 may contain various types of data including configuration data, which are needed to configure the RAID disks 303-306.

An option ROM 307 is shown within the RAID controller 301. The option ROM 307 generally contains some set of program instructions known as BIOS image, which helps in initializing the RAID system at the time of boot-up. As per one embodiment of the invention, software configuration data 302 is stored in the option ROM 307 as part of the BIOS image. A user may write desired software configuration data 302 in the BIOS area by using the flash utilities, or high-level utilities within an operating system. For example, a high level application may store the configuration data 302 on both the disk 303-306 and on the BIOS.

In one embodiment of the invention, when a system boots up, the BIOS performs the basic initialization routine. The system BIOS mirrors the option-ROM 307 to the host and transfers the control to the option-ROM 307. Once the option-ROM 307 starts the execution, it reads the RAID configuration 302 as a part of its information (BIOS image) for further processing. If the BIOS identifies any mismatch or error in the configuration data, it may facilitate a user to interact until the data is actually read by the system. One manner in which this identification may occur is having the BIOS recognizes an error generated by the drive and or the controller 301. For example, the BIOS may read the 'start bits' of the first disk in order to analyze what configuration the disks are following. Thereafter when the BIOS reads the first drive, it is able to interpret the configuration of other drives also. The BIOS goes on to the other drive and tries to read the same information on the other disks. The BIOS may find a foreign configuration, or if whole disks are gone then the BIOS may figure out that there is no configuration present or if somebody either accidentally or purposely erased the whole disk then the BIOS figure out that the configuration is either corrupted or not present.

Generally, the BIOS in the controller 301 scans each drive and checks for the configuration to make sure that all the drives in the system are consistent with each other or having a valid configuration. If the drives are found to be inconsistent or invalid configuration then the configuration is either updated or default configuration stored on the BIOS is used to correct the system and that configuration is written on to the software configuration.

The BIOS may also write its own default configuration on the drives. However, a user may prefer to write his/her own specific configuration as desired. Therefore, the user may only refer to the configuration data present in the BIOS image, and then recreate the configuration as desired.

C. Configuration Data within a Memory Device in a Host System

Figure 4:
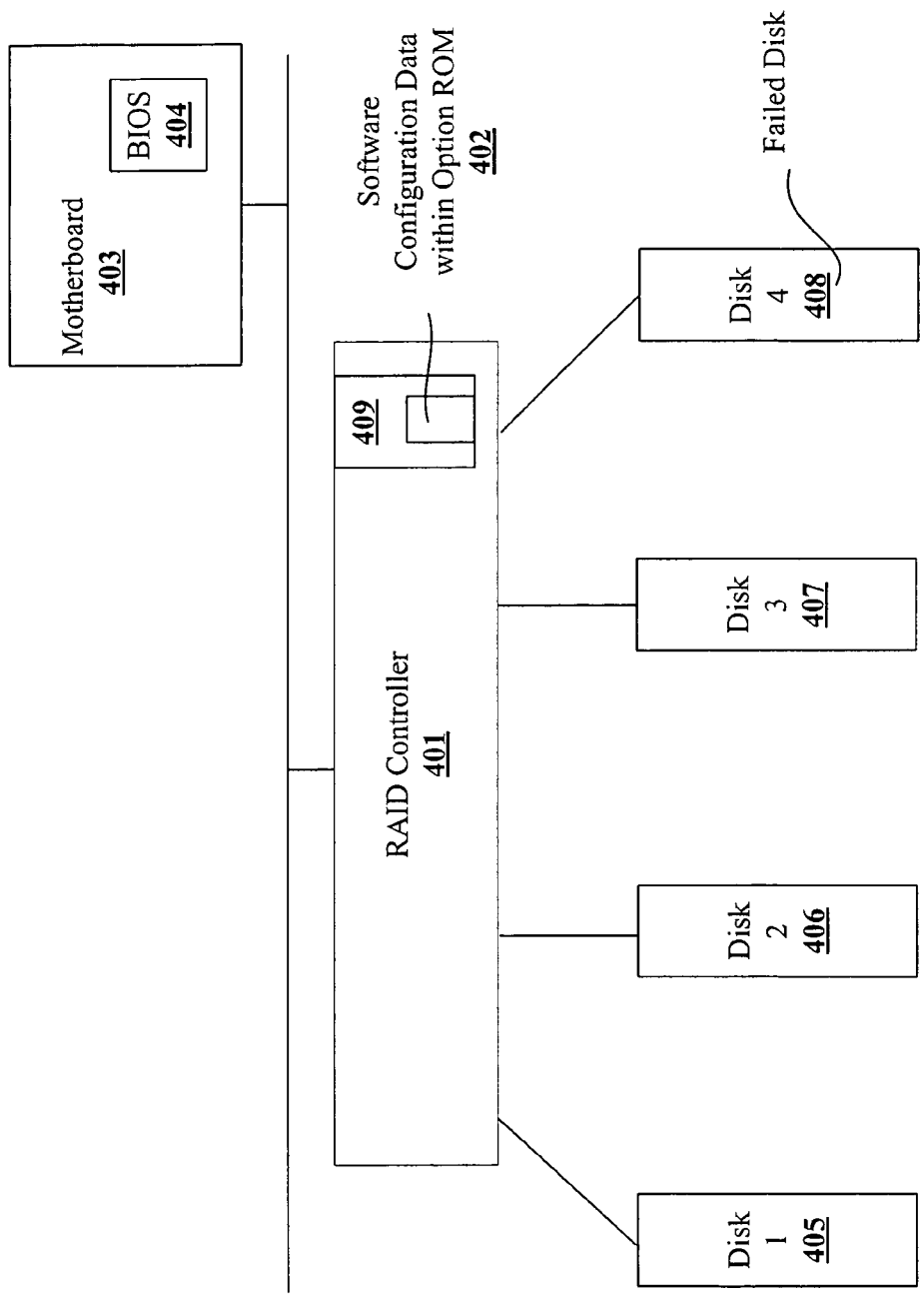
FIG. 4 illustrates software configuration data stored in the BIOS located in the host system according to one embodiment of the invention.
Figure 5:
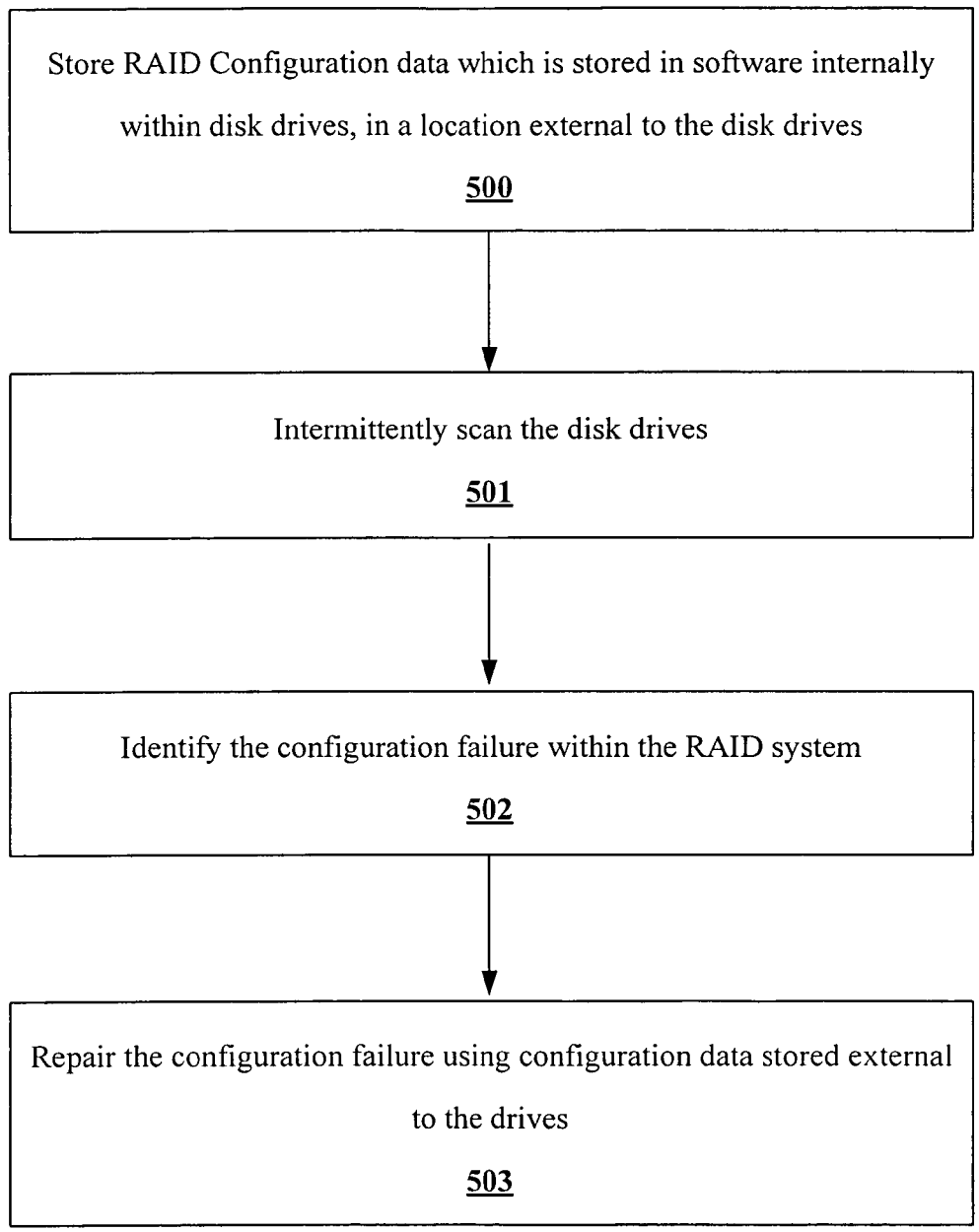
FIG. 5 is a flowchart illustrating a method for storing RAID configuration data as part of BIOS image on software RAID solutions according to one embodiment of the invention.

FIG. 4 illustrates a host and RAID system having configuration data stored external to drives within the RAID according to one embodiment of the invention. In one embodiment of the invention, the configuration data may be flashed on a memory chip such as the motherboard BIOS 404. Motherboards generally have a large amount of space to store any size of the configuration data. Some motherboard BIOS may load the entire image irrespective of its size. The configuration data 402 is stored basically as part of BIOS image in the option ROM. At the time of system boot-up, the BIOS image is executed. The BIOS image looks for the configuration data 402 present in the option ROM 409 and resolves the configuration for which it is programmed. If the BIOS image is not loaded by the motherboard BIOS 404 then the option ROM BIOS 409 may be used to write routines to read the flash chip.

The flash chip may also be located in the controller 401 as described earlier in this specification since the configuration data is independent of the location where it is stored. When the system boots up, it reads the flash chip. In either case, the motherboard BIOS 404 or the host BIOS 404 may load either fully along with the configuration data 402 or during the size restriction it can load a portion of the executable. If it is loaded partially then the user may include his/her flash re-program into the BIOS routines and the content of the flash chip may be read physically.

The updating process of the configuration may be performed by various high level applications. For example, when a system boots up, certain high level application is running within the system. The high level utilities have enough intelligence to write the data 402 into the flash chip. A user may therefore use these utilities to update the configuration. The updated configuration is written on the first disk 405 within an array and then the same configuration is pushed down in the drive or he/she may update the flash memory, and thereafter the system may push those updates from the flash memory down to the drives 405-408 themselves.

Another process for updating can be explained by way of another example. A system may be operating and a user may change the configuration by voluntarily writing the data into the flash memory and loading the same to the hard drive. The user may also write the data into the flash memory and then reboot the system. The content present in the flash memory is the default configuration and may be considered to be the best configuration which may be automatically written on the disk in order to maintain consistent configuration across the system.

In the cases where motherboard BIOS cannot map entire configuration details, the option-ROM may use its internal logic to access the flash chip so as to dynamically update the configuration. Further, high-level applications (operating system) can also access configuration details from BIOS area or directly from the flash memory.

D. Method of Storing Software Configuration Data

FIG. 4 illustrates a method, independent of stricture, for storing and maintaining drive configuration external of the drives within a RAID according to one embodiment of the invention. The RAID configuration data, which is stored in software internally within the disk drives; is stored 500 in a location external to the disk drives. These disk drives are scanned 501 intermittently so as to identify 502 any configuration failure within the RAID. The configuration data, which is stored external to the drives, is then used to repair 503 the configuration failure.

The present invention facilitate various OEMS to pre-build their systems with RAID configurations on an option-ROM, so that once users attach the drives of his/her choice, the configuration could be updated as desired. Thus, the invention provides the configuration data to be saved in dual locations for the RAID solutions.

Alternatively this invention could be used in different dedicated chips other than the option ROM.

The foregoing description of the invention has been described for purposes of clarity and understanding. It is not intended to limit the invention to the precise form disclosed. Various modifications may be possible within the scope and equivalence of the appended claims.

I claim:

1. A method for providing redundancy of RAID configuration data, the method comprising:
    storing RAID configuration data, which is stored in software internally on a disk drive within a RAID, within at least a portion of a BIOS image in a second location external to the disk drives;
    scanning each disk drive within the RAID intermittently;
    identifying a configuration failure within the RAID; and
    repairing the configuration failure using the configuration data stored in the second location external to the disk drives.

2. The method of claim 1 wherein the configuration data is stored on a memory device located within a host system of the RAID.

3. The method of claim 2 wherein the memory device is located on a motherboard in the host system of the RAID.

4. The method of claim 2 wherein the configuration data is stored on a BIOS within the host system of the RAID.

5. The method of claim 1 wherein the configuration data is stored on a RAID controller.

6. The method of claim 5 wherein the configuration data is stored within an option ROM on the RAID controller.

7. The method of claim 1 wherein the RAID configuration data reflects a subset of the configuration data that is stored in software internally within the disk drives.

8. The method of claim 1 wherein the configuration data is written to the second location using a flash utility within the host system.

9. A system for providing redundancy of RAID configuration data, the system comprising:
    a plurality of disk drives, coupled within a RAID, on which configuration data is stored;
    a memory device, located external to the disk drives, on which a redundant copy of at least a portion of the configuration data is stored within at least a portion of a BIOS image;
    a scanning device, coupled to communicate with the RAID, that intermittently scans the disk drives to identify failures; and
    a configuration repair tool, coupled to communicate with the RAID and the memory device, that rebuilds a disk drive configuration using the redundant copy of at least a portion of the configuration data.

10. The system of claim 9 wherein the memory device is located on a controller for the RAID.

11. The system of claim 10 wherein the at least a portion of the configuration data is stored in an option ROM located on the controller.

12. The system of claim 9 wherein the memory device is located within a host system for the RAID.

13. The system of claim 12 wherein the configuration data is stored within a BIOS of the host system.

14. The system of claim 9 further comprising a processing device, coupled to communicate with the RAID, that intermittently scans the disk drives within the RAID to identify a drive failure event.

15. The system of claim 9 wherein the redundant copy of the at least a portion of the configuration data is stored in a compressed format.

16. A computer program product embodied on a computer readable medium for providing redundancy of configuration data of disk drives within a RAID, the computer program product comprising computer instructions for:

storing RAID configuration data, which is stored in software internally on a disk drive within a RAID, within at least a portion of a BIOS image in a second location external to the disk drives;

scanning each disk drive within the RAID intermittently;

identifying a configuration failure within the RAID; and repairing the configuration failure using the configuration data stored in the second location external to the disk drives.

17. The computer program product of claim 16 wherein the configuration data is stored on a memory device located within a host system of the RAID.

18. The computer program product of claim 17 wherein the memory device is located on a motherboard in the host system of the RAID.

19. The computer program product of claim 16 wherein the configuration data is stored on a RAID controller.

20. The computer program product of claim 19 wherein the configuration data is stored within an option ROM on the RAID controller.

* * * * *